US010191779B2

(12) United States Patent
Georgescu et al.

(10) Patent No.: US 10,191,779 B2
(45) Date of Patent: Jan. 29, 2019

(54) APPLICATION EXECUTION CONTROLLER AND APPLICATION EXECUTION METHOD

(71) Applicant: FUJITSU LIMITED, Kawasaki-shi, Kanagawa (JP)

(72) Inventors: Serban Georgescu, London (GB); David Snelling, Bucks (GB); Nicholas Wilson, Middlesex (GB); James Alastair Southern, Reading (GB)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 14/796,177

(22) Filed: Jul. 10, 2015

(65) Prior Publication Data
US 2015/0317189 A1 Nov. 5, 2015

Related U.S. Application Data

(63) Continuation of application No. PCT/EP2014/050177, filed on Jan. 7, 2014.

(30) Foreign Application Priority Data

Jan. 10, 2013 (EP) .................................... 13150879

(51) Int. Cl.
*G06F 9/50* (2006.01)
(52) U.S. Cl.
CPC .............. *G06F 9/5061* (2013.01); *G06F 9/50* (2013.01)
(58) Field of Classification Search
CPC .................................. G06F 9/5061; G06F 9/50
See application file for complete search history.

(56) References Cited

U.S. PATENT DOCUMENTS

| 9,304,803 | B2 * | 4/2016 | Nelson | G06F 9/45558 |
| 9,436,493 | B1 * | 9/2016 | Thomas | G06F 21/53 |
| 2005/0010608 | A1 * | 1/2005 | Horikawa | G06F 9/4862 |

(Continued)

FOREIGN PATENT DOCUMENTS

WO    WO 2012/099643    7/2012

OTHER PUBLICATIONS

Zhu et al., "Self-Adapting, Self-Optimizing Runtime Management of Grid Applications using PRAGMA", Proceedings of the International Parallel and Distributed Processing Symposium, 2003, 7 pp.

(Continued)

*Primary Examiner* — Lewis A Bullock, Jr.
*Assistant Examiner* — Bruce S Ashley
(74) *Attorney, Agent, or Firm* — Staas & Halsey LLP

(57) ABSTRACT

A controller to instruct execution in an environment of plural computing resources. The controller comprising: an information collecting unit to collect available resource information of computing resources available to execute an application indicating an amount and/or type of computing resource available in categories of computing resource; scalability information including an indication of application execution rate; and performance target information including an indication of performance targets. The controller further comprises: a configuration selection unit to select a configuration which will come closest to meeting, the performance targets; and an instructing unit to instruct the execution of the application using the selected configuration.

12 Claims, 10 Drawing Sheets

(56) References Cited

U.S. PATENT DOCUMENTS

| | | |
|---|---|---|
| 2008/0126761 A1 | 5/2008 | Fontenot et al. |
| 2009/0228888 A1 | 9/2009 | Vengerov et al. |
| 2009/0254660 A1 | 10/2009 | Hanson et al. |
| 2010/0131590 A1 | 5/2010 | Coleman et al. |
| 2011/0145830 A1 | 6/2011 | Yamaguchi |
| 2011/0231813 A1 | 9/2011 | Seo et al. |
| 2011/0246549 A1 | 10/2011 | Katzenberger et al. |
| 2012/0173906 A1 | 7/2012 | Elnozahy et al. |
| 2012/0215838 A1 | 8/2012 | Dominick et al. |

OTHER PUBLICATIONS

International Search Report dated Apr. 8, 2014 in corresponding International Application No. PCT/EP2014/050177.
Chuang Liu, et al., "Design and Evaluation of a Resource Selection Framework for Grid Applications", IEEE, Nov. 2002, pp. 1-10.
European Search Report dated May 13, 2013 in corresponding European Application No. 13150879.8-1954.

* cited by examiner

| | Time | HDD | RAM | Cores | Nodes |
|---|---|---|---|---|---|
| Time | | 0 | 0 | -1 | -0.9 |
| HDD | | | 0 | 0 | 0 |
| RAM | | | | 0 | -1 |
| Cores | | | | | 0 |
| Nodes | | | | | |

|        | Time | HDD | RAM | Gen  | Cores | Nodes |
|--------|------|-----|-----|------|-------|-------|
| Time   |      | 0   | 0   | -1   | -0.8  | -0.95 |
| HDD    |      |     | 0   | 0    | 0     | 0     |
| RAM    |      |     |     | 0    | 0     | -1    |
| Gen    |      |     |     |      | 0     | 0     |
| Cores  |      |     |     |      |       | 0     |
| Nodes  |      |     |     |      |       |       |

FIGURE 11

|        | RAM   | Gen | Cores | Cost | Nodes |
|--------|-------|-----|-------|------|-------|
| Type 1 | 4GB   | 1   | 1     | 0.1  | 250   |
| Type 2 | 16GB  | 2   | 4     | 0.2  | 100   |
| Type 3 | 48GB  | 4   | 12    | 0.25 | 20    |
| HDD    | 100GB |     |       | 0.1  |       |

FIGURE 12

APPLICATION EXECUTION CONTROLLER AND APPLICATION EXECUTION METHOD

CROSS REFERENCE TO RELATED APPLICATIONS

This application claims the benefit of International Application No. PCT/EP2014/050177, filed Jan. 7, 2014, which claims the benefit of European Patent Application No. 13150879.8, filed Jan. 10, 2013, the disclosures of all of which are incorporated herein by reference.

BACKGROUND

1. Field

The present invention lies in the field of computing in multi-resource computing environments, and in particular relates to workload handling and scheduling in cloud computing.

2. Description of the Related Art

There is a growing trend toward using software installed and running on internal or remote data centre facilities rather than having software installed locally on each and every machine which may need to utilize the functionality provided by the software. This trend for 'on-demand' or 'cloud' computing services can provide a platform for a more efficient use of resources than is achieved by the local installation and execution of software. Advantageously, economies of scale can be realized when managing large sets of computers in a centralized manner as opposed to working on a per-machine basis. Cloud computing and software as a service (SaaS) are two widely known and adopted manifestations of this model. While cloud computing is a computing paradigm which is utilized and implemented in many forms, including providing infrastructure as a service, and is enabled by different platforms, the generally accepted definition is the delivery of computing power as a service rather than a product. Accordingly, pricing models for cloud computing infrastructure services can be structured in a similar manner to that of an utility. The same model applies in the case of SaaS, where what is being delivered to the user is the functionality of a software rather than just raw computing power. Both cloud computing and SaaS can be utilized to reduce the total IT costs (in terms of finances and/or $CO_2$ generation) and in particular to lower the barriers to entry, as the upfront and maintenance costs for both software and infrastructure are very small or even non-existent.

Cloud computing services may be provided by data centers, in which a large number of networked computing devices work in cooperation with one another to collectively handle the workload placed on the data centre by requests from clients/users. The computing devices in the data centre may not all be identical, and some may have components (computing resources) particularly suited to executing certain applications rather than others. Furthermore, using certain of the computing resources in the data centre may have different cost implications to using certain other resources. Therefore, some degrees of freedom exist in allocating tasks (which for the purposes of this document shall be considered to be executing an application) to different configurations of computing resources.

Previous work done towards optimizing the execution of applications can be divided in two categories:

Cloud applications which scale up/down as function of the number of users/tasks. Such optimization is generally only applicable to task-parallel applications. However, applications of increased complexity, like the ones used in the fields of scientific and technical computing, do not benefit from such optimization techniques.

Self-optimizing middleware systems. Such systems make use of monitoring tools (e.g. performance counters) in order to produce a model of the execution of the applications, which is then used to manage the application in a way which maximizes a specified utility function. Such systems do not measure the scalability of an application.

SUMMARY

Embodiments of the present invention include an application execution controller, configured to instruct an execution of an application in a computing environment having a plurality of different amounts and/or types of a plurality of categories of computing resource to allocate to executing applications; the controller comprising: an information collecting unit, configured to collect: available resource information detailing a plurality of configurations of computing resources available to execute the application, wherein the configurations each include a indication of an amount and/or type of computing resource available in each of the plurality of categories of computing resource; application execution scalability information including, for computing resources in at least one of the plurality of categories, an indication of how different amounts and/or types of computing resource in that category correlate with execution rate of all or a portion of the application; and performance target information including a indication of one or more performance targets for the execution of the application; a configuration selection unit configured to perform a selection of a configuration from among the plurality of configurations detailed in the available resource information which, based on the application execution scalability information, will meet, or will come closest out of said plurality of configurations to meeting, the one or more performance targets; and an instructing unit configured to instruct the computing environment to execute the application using the selected configuration.

The elastic nature of multi-resource computing environments such as cloud environments (wherein "cloud environment" is a shortened form of "cloud computing environment") provide a multitude of different configurations of types and amounts of resources on which applications can be executed/run. The optimization of the execution of applications has the potential to provide reductions in execution time, running costs or both. However, manually adjusting the configurations of computing resources to which executions of applications are allocated is a tedious, time consuming process. Four major reasons why this is the case are:

a) Lack of knowledge about the inner-workings of the application. Detailed knowledge about the inner-workings of the application is required to optimally tune the execution of the application. For example, the user or decision-making-entity needs to know the impact of increasing the number of nodes to the overall execution speed in order to decide whether and to what extent to increase this number.

b) The possible coupling between system state variables (e.g. CPU power, RAM, HDD speed, Network speed). For example, in many scientific applications, the amount of RAM per node used in executing an application is coupled (correlated) to the number of nodes (wherein 'node' refers to a computer within the networked environment) used by the application, in the sense that it is inversely proportional to it. However, it is constant with respect to the number of CPU cores. Another example is applications in which a certain amount of redundant computation is performed on each node in order to perform less communication between nodes, where the communication size is coupled to the amount of RAM and CPU power.

c) The fact that many applications are heterogeneous in nature. Estimating the benefits of migrating the application to a different configuration of computing resources is much more difficult if the computational requirements of an application vary with time. For example, an application can have I/O dominant sections where data is read and written to/from a disk or network and CPU dominant sections where computations are performed. Different configurations of types and amounts of computing resources are required to optimize the execution of such loads.

d) Lack of knowledge about the current state of the system. Although information about the complete state of the system at a particular point in time (e.g., number and time of unused cores, free RAM, free disk space) is available to certain entities within the infrastructure software controlling a cloud environment or other multi-resource computing environment, this data is not necessarily available to the user or decision-making-entity.

Existing application execution optimization techniques which rely on modeling based on profiling data are not suitable in a multi-resource computing environment such as a cloud environment because:

it is not possible to measure how an application will scale on different types of hardware without actually migrating to such hardware, which in turn can incur a high cost;

profiling data suffer from a lack of reliability for applications which are heterogeneous in nature; and accurate profiling data may be difficult to gather in environments when the resources of a machine are shared by multiple running applications.

Advantageously, embodiments of the present invention provide an automated, generalized, and robust framework that controls how an application executes in multi-resource computing environments such as cloud environments, such that the executions of the applications satisfy user preferences.

Embodiments of the present invention provide a mechanism to perform optimization of resource configuration selection on a per application basis, by taking into account one or more performance targets, such as user preferences expressed via a client requesting execution of the application (e.g. minimize execution time or minimize cost). This type of optimization is particularly suited to an environment such as a cloud environment where the availability of a large number of machines with different types of hardware (e.g. more powerful processors, larger memory or faster storage) available at different rates (usually, the more powerful the machine the more expensive it is to use) provide users with multiple ways of running applications. As such, the optimization mechanism provided by embodiments of the present invention combines information about the performance targets and inner-workings of the applications in the form of application execution scalability information with information about the resources currently available in the computing environment in order to instruct the execution of the application on the most suitable resources that are available.

In multi resource computing environments in which software is provided as a service, the flexible or elastic nature of SaaS (Software as a Service) and the cloud computing model in general gives a client requesting execution of an application additional degrees of freedom in choosing the amount and types of resources assigned to running a particular execution of an application. In contrast to the traditional computing model in which applications run on a local workstation and the time taken to execute a particular application is only a function of the performance of the underlying hardware, cloud computing or SaaS can potentially offer a degree of control over the configuration of resources employed in a particular execution of the application by giving a user (via a client machine) the freedom to choose the way the application is executing, for example, by specifying a number of performance targets. For example, the user can cause an application to execute faster by either assigning more computing nodes to the application or choosing faster ones, or both. Quite the opposite, if execution time is not the first constraint, the user can use fewer or slower nodes to run the application in order to reduce costs.

Embodiments of the present invention provide a mechanism by which users, via a client machine, the application and the execution platform (computing environment) share information through a common framework in order to optimize the execution of the application in accordance to performance targets, for example, needs or preferences expressed by a user.

Optionally, the application execution scalability information includes, for the or each of at least one category from among the plurality of categories of computing resource as a first category, an indication of how different amounts and/or types of the first category used in executing all or a portion of the application correlate with amounts and/or types required of at least one other category from among the plurality of categories of computing resources as a consequence of changing the amount and or type of the first category.

In addition to execution variables such as time and cost being dependent upon the amount and/or type of computing resources in different categories used in executing an application, the amount and/or type of computing resources used may be dependent upon one another, that is to say, coupled. The coupling may be expressed as a correlation between the two categories in past executions of the application. Advantageously, providing such information enables the configuration selection unit to optimize the execution in a more accurate way, therefore enabling performance targets to be met more consistently.

A compact and efficient way of expressing the application execution scalability information is a scalability matrix. A scalability matrix is a matrix with each of a plurality of execution variables including at least time (execution rate) and a category of computing resource as column and row headings, so that the matrix includes an entry corresponding to each pairing from among the plurality of execution variables. The entry may then be a numerical indication of the correlation or coupling between the two execution variables. For example, the fact that a change in one execution variable does not affect another is reflected by a "0" entry in the scalability matrix. A value of "1" denotes perfect scalability. A value of "−1" denotes perfect negative scalability, so that doubling one execution variable halves the other.

An exemplary scalability matrix comprises an entry for each pair of factors from among a plurality of factors comprising each of the plurality of categories of computing resource and execution rate, the entry representing the effect of a proportional change along a linear scale representing usage of different amounts/types of a first factor from the pair of factors on the amount/type required of a second factor from the pair of factors, in terms of a proportional change along a linear scale representing different amounts/types of the second factor. In addition, the scalability matrix may represent higher order relationships between pairs of factors. Higher order terms can be added which represent the scalability relationship between two factors as a quadratic, or even higher order relationship.

The application execution scalability information such as the scalability matrix may be available on a per-application basis, or may be available for specific portions within an application. The application execution scalability information may be read from a third party module by the information collecting unit. The indication may be a quantitative indication.

The information may be received by the information collecting unit upon receipt of a request to execute an application at the computing environment from a client. In order to best optimize the use of computing resources in the computing environment, the application execution controller is configured to instruct the execution of the application prior to the start of the execution.

Advantageously, in addition or as an alternative to selecting the configuration of computing resources on which to initiate execution of the application, the application execution controller may be responsive to changes in any of the relevant information. For example, during the execution of the application: the information collecting unit is configured to collect updated versions of any of the available resource information, the application execution scalability information, and the performance target information, and to use said new information to update either or both of the available resource information and the performance target information; and using the updated versions of the information where available, the configuration selection unit is configured to perform an updated selection of a configuration from among the plurality of configurations detailed in the available resource information which, based on the application execution scalability information, will meet, or will come closest out of said plurality of configurations to meeting, the one or more performance targets specified in the performance target information; and the instructing unit is configured to instruct the computing environment to continue executing the application using the updated selection of configuration.

Hence, the application execution controller, such as that defined above, provides a mechanism which is adapted to the flexible nature of multi-resource computing environments, and is configured to select an optimized configuration of computing resources on an ongoing basis. For example, the execution of the application may reach a point at which its mode of execution changes significantly, in which case the most suitable computing resources to meet the performance targets may change. Alternatively, new computing resources may come available which are more suited to meeting the performance targets than the current configuration of resources being used. As a further alternative, the user or entity on behalf of which the application is being executed may set a new performance target in addition or as an alternative to the previous/existing performance targets. All of these situations can be responded to by the application execution controller.

In addition to time taken to execute the application, performance targets may also take into account other execution variables, such as cost. Cost may be a financial cost of the service (service cost) of executing the application, and/or may be an energy cost related to the amount of $CO_2$ generated by the execution. A cost metric combining the two measures is also possible in invention embodiments. As a mechanism for computing and comparing costs, the available resource information may include a quantitative indication of a cost of the amount and/or type of computing resource in each of the plurality of categories. Optionally, in such embodiments, the cost is a carbon dioxide generation cost and/or a service cost.

In order to select the most suitable configuration of computing resources to satisfy the time/cost/resource usage targets, it may be that the configuration selection unit is configured to formulate one or more problems based on the performance target specified in the obtained performance target information. In particular, the configuration selection unit may be configured to characterize the or each of the one or more performance targets as either constraints or selection discriminator, wherein constraints specify acceptable ranges of execution variables, and selection discriminators specify a metric for use by the configuration selection unit in comparing configurations in order to select one from a plurality of configurations. By dividing the performance targets into two groups in dependence upon the logical steps corresponding to determining whether or not the performance target is/will be fulfilled, the analysis required to select the most suitable configuration to execute the application is simplified. For example, performance targets may be set which set a threshold or acceptable range which, based on the application execution scalability information, the configuration selection unit can distinguish between those configurations that will meet the target and those that will not. Such targets are referred to as constraints. On the other hand, performance targets may be set which rely on comparisons between the configurations themselves (and the implications on the execution variables associated with selecting the configurations), for example, finding the cheapest or quickest configuration. Such targets are referred to as selection discriminators, and provide a basis for comparing configurations and hence placing them in order.

In particular embodiments, the configuration selection unit is configured to extract various information from each performance target for use in formalizing the problem to be solved in selecting the optimum configuration of computing resources. For example, in characterizing the performance targets into constraints and selection discriminators, the configuration selection unit may be configured to identify a metric upon which a selection discriminator is based. For example, wherein the metric may be based on an execution variable including one or more of the following: cost of the configuration; rate of execution of the configuration; and usage of one or more categories from among the plurality of categories of computing resource.

In more complex use cases, it may be that when the performance targets include more than one selection discriminators, the execution configuration selection unit is configured to group the selection discriminators into one or more independent groups, wherein selection discriminators specifying metrics based upon execution variables which are indicated as correlated in the application execution scalability information are grouped together, and otherwise selection discriminators are grouped apart.

Advantageously, the application execution scalability information provides a basis for identifying which execution variables are coupled, and hence should be grouped into a single problem (i.e. one depends on the other so the degrees of freedom which the configuration selection unit can exercise in identifying the optimum configuration of computing resources is reduced), and which are not coupled, and hence can be treated as independent variables in setting and solving the optimization problem.

As a further formalization of the analysis and problem solving performed by the configuration selection unit, in certain embodiments, each of the independent groups is combined with any constraints specifying an acceptable range of an execution variable which either is, or is indicated as correlated to, an execution variable upon which the metric(s) specified by the selection discriminators in the independent group are based in order to define an optimization problem corresponding to the independent group; and the configuration selection unit is configured to select a configuration by performing a solving algorithm to solve the defined optimization problem or optimization problems.

Embodiments of another aspect of the present invention provide a computing environment comprising a plurality of different amounts and/or types of a plurality of categories of computing resource to allocate to executing applications, the computing environment comprising a controller including an application execution controller embodying the present invention.

The application execution controller may be provided as a component of a multi-resource computing environment, such as a cloud environment. In such examples, a multi-resource computing environment or cloud environment may be a data centre in which a plurality of computing devices such as servers are housed in an enclosure, and may be placed on racks or some other structure. The computing devices may be networked, and configured to cooperate in handling the total workload of the data centre, for example, by being organized by a controller having workload scheduling functionality.

Such a computing environment may further comprise a task scheduler, configured to allocate application executions to computers in accordance with instructions received from the application execution controller, wherein tasks include an execution of an application; wherein the task scheduler is configured to obtain the application execution scalability information relating to an application, and, if the obtained application execution scalability information indicates a correlation of any of the categories with execution rate that exceeds a predetermined threshold correlation, to avoid allocating the execution of the application to computers already performing an execution of an application which also exceeds the predetermined threshold correlation in the same category.

Advantageously, such embodiments leverage the application execution scalability information to derive a further beneficial technical effect in a computing environment. Namely, the application execution scalability information can be utilized to ensure resource bottlenecks are avoided by tending not to place more than one application execution whose performance is strongly coupled to the same computing resource on a single machine.

Embodiments of another aspect of the present invention provide an application execution control method for instructing an execution of an application in a computing environment having a plurality of different amounts and/or types of a plurality of categories of computing resource to allocate to executing applications; the method comprising: collecting the following information: available resource information detailing a plurality of configurations of computing resources available to execute the application wherein the configurations each include a indication of an amount and/or type of computing resource available in each of the plurality of categories of computing resource; application execution scalability information including, for computing resources in at least one of the plurality of categories, an indication of how different amounts and/or types of computing resource in that category correlate with execution rate of all or a portion of the application; and performance target information including a indication of one or more performance targets for the execution of the application. The method further comprises: performing a selection of a configuration from among the plurality of configurations detailed in the available resource information which, based on the application execution scalability information, will meet, or will come closest out of said plurality of configurations to meeting, the one or more performance targets; and instructing the computing environment to execute the application using the selected configuration.

In embodiments of another aspect of the present invention, there is provided a computer program, which, when executed by a computing apparatus, causes the computing apparatus to function as an application execution controller embodying the present invention.

In embodiments of another aspect of the present invention, there is provided a computer program which, when executed by a computing apparatus, causes the computing apparatus to execute a method embodying the present invention.

In particular, the indications referred to above and elsewhere in this document may be quantitative indications, such as numbers, or indications of levels which can be converted into numerical values via a lookup table or some other mechanism.

Embodiments of another aspect of the invention include software which, when executed by a computer or a distributed network of computers, causes the computer or the distributed network of computers to become (or to function as) a data storage system embodying the invention. The distributed network of computers may include one or more storage units, which may also be distributed. The software may be a computer program or a suite of computer programs, which may be provided on a non-transitory storage medium.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

BRIEF DESCRIPTION OF THE DRAWINGS

These and/or other aspects and advantages will become apparent and more readily appreciated from the following description of the embodiments, taken in conjunction with the accompanying drawings of which:

FIG. 11 presents an example of a 1st order scalability matrix in an implementation example of an invention embodiment;

FIG. 12 presents an example of a resource table in an implementation example of an invention embodiment.

DETAILED DESCRIPTION

Figure 1:
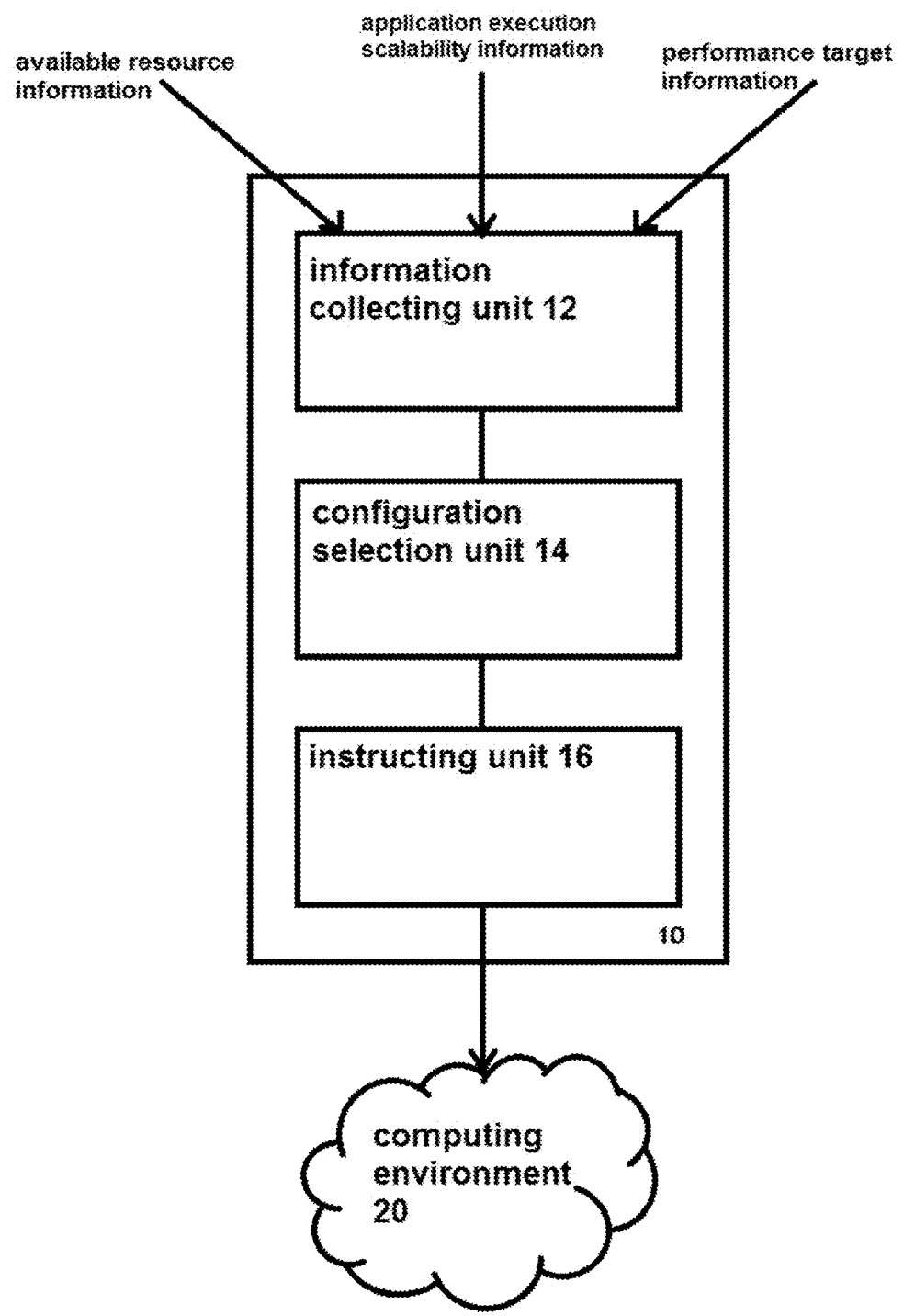
FIG. 1 is a schematic representation of an application execution controller embodying the present invention.

FIG. 1 is a schematic representation of an exemplary application execution controller 10.

The application execution controller 10 includes an information collecting unit 12, a configuration selection unit 14, and an instructing unit 16. The lines between the units represent the ability of the units to transfer information between one another. In particular, the information collecting unit 12 is configured to receive information including available resource information, application execution scalability information, and performance target information, and to transfer the collected information to the configuration selection unit 14. The configuration selection unit 14 is configured to receive the information from the information collecting unit 12, and to transform the information into a selection of a configuration. The configuration selection unit 14 is then configured to transfer the selection of a configuration, in the form of data representing the selected configuration, to the instructing unit 16. The instructing unit 16 is configured to receive the selection or data representing the selection from the configuration selection unit 14, and to transform the selection or data into an instruction or set of instructions for the computing environment 20 in order to realize/implement the selected configuration. The application execution controller 10 is illustrated as external to the computing environment 20, however, depending on the implementation details, it may be that the application execution controller 10 is actually provided as part of the execution environment 20.

The information collecting unit 12, configuration selection unit 14, and the instructing unit 16 may be provided as hardware or may be software modules/components running on a computing device. Such software modules, when executed, cause the computing device to become, or to function as, the information collecting unit 12, configuration selection unit 14, and instructing unit 16. Alternatively, it may be that the software modules are executed across more than one computing device, so that those more than computing devices become the information collecting unit 12, configuration selection unit 14, and instructing unit 16.

The information collecting unit 12 is configured to collect information including three particular types of information: available resource information, application execution scalability information, and performance target information. The information may arrive at the information collecting unit 12 without a prompt from the unit itself, or it may be that the information collecting unit is triggered by the computing environment 20 upon receipt at the computing environment 20 of a request to execute an application, and that in response to that trigger, the information collecting unit requests information from respective sources. For example, a source of available resource information may be the computing environment 20 itself, or specifically a controller or scheduler responsible for workload allocation within the computing environment 20. The application execution scalability information may be stored with the application in an application storage unit in the computing environment 20 or accessible to the computing environment, and hence the application or storage unit on which the application is stored may be the source of the application execution scalability information. The performance target information may be in the form of user preferences, and hence the user, via a client machine responsible for the request to execute the application, may be a source of performance target information.

The information collecting unit 12 may include a storage function and may store the information collected for a particular execution of an application during the execution, in order that new information can be received and combined with the stored information in order to generate updated information. The information collecting unit 12 may be configured to check for new information periodically by sending a request to the information sources. Alternatively, it may be that new information is simply received at the information collecting unit 12 as and when it is generated and transferred by the information sources. The information collecting unit 12 is configured to recognize which portions of stored information are superseded by received new information, to replace the superseded with the new information in order to produce updated information, and to transmit the updated information to the configuration selection unit 14.

Available resource information details a plurality of configurations of computing resources available to execute the application. A configuration is taken to be a type or amount of each of a plurality of categories of computing resource. The available resource information may simply include information representing which amounts and/or types of each of a plurality of categories of resource are available, which inherently includes various combinations and permutations of those amounts and/or types as configurations. A category of computing resource may refer to hardware with the same function. So, Hard Disk Drives (HDD), processors, RAM, nodes, and cores are all examples of computing resources. The computing resources may specifically be hardware resources such as computing hardware. A computing environment, such as a distributed computing environment, is composed of a number of individual computers, usually referred to as nodes, connected by and capable of exchanging information via a network. Each node includes more processors (CPUs), where each processor contains one or more individual computation units called "cores". We refer to a node having M processors, each of which having N cores, as a "M*N"-core node.

A type of a category of computing resource may refer to a subset of hardware within that category that has a certain level of functionality from among established (or at least known to the computing environment 20 and application execution controller 10) benchmark levels of functionality. For example, a generation of CPU is an example of a type (generation) of a category (CPU) of computing resource. It may be that the types of a category of computing resource can be placed in order of functionality by the application execution controller and the individual units therein. Such an order may be used in establishing correlations, either by the application execution controller, or in information obtained by the information collecting unit 12.

Application execution scalability information includes a quantitative indication of how different amounts and/or types of computing resources within different categories of computing resources correlate with execution rate in executing the application. The application execution scalability information may relate to the execution of the whole application, or to a particular, specified, section from within the application. For example, it may be that there are points within the execution of an application at which the computing resource executing the application is configured to request that the application execution controller generate new instructions for a configuration of computing resources to execute the next section of a portion of the application. At such points, the information collecting unit 12 may be configured to obtain application execution scalability information relating to execution of the forthcoming portion of the application. The application execution scalability information may be based on one or more of the following: benchmark information from the application developer; performance statistics from past executions of the application in the computing environment; performance statistics from past execution of algorithms having common characteristics with those of the application, and/or theoretical considerations.

The correlation between different types/amounts of a particular category of computing resource and execution rate, or between usage of different types/amounts of pairs of categories of computing resource, may represent a coupling between the correlated factors. The correlation may be expressed as a quantitative indication, and the quantity may represent the strength of coupling between correlated factors.

It should be noted that where execution rate is discussed, it includes expressions of time taken, since information representing time taken to complete an execution of an application or portion of an application also inherently represents the execution rate. Alternatively, the execution rate may be given as, for example, a proportion of the application or portion of the application executed in a given time period. An example of the application execution scalability information is the scalability matrix, which is discussed in detail below.

Performance target information may be defined as a set of criteria which the execution of the application aims to satisfy. The performance targets may be given in terms of execution variables, wherein execution variables include usage of computing resources, time taken, and cost incurred. Performance targets may include absolute or relative usage of particular types or amounts of computing resources in a particular category. For example, use a maximum of 4 GB RAM, use the least amount of HDD space possible, use a 3rd generation CPU. Other examples of performance targets include: minimize $CO_2$ generated (cost); minimize service (financial) cost, minimize time taken, complete the execution in fewer than X hours etc. Performance target information may originate from a variety of sources. For example, the application itself may be pre-configured with default performance targets (i.e. execute as quickly as possible). Alternatively or additionally, performance targets may be set or selected by a user at a client machine from which the request to execute the application was received. As a further alternative, the entity which requested the execution of the application (be it a user via a client machine or otherwise) may have a user profile stored in or accessible to the application execution controller from which performance targets for executing the application can be retrieved.

The configuration selection unit 14 is configured to receive information from the information collecting unit 12 and to use the information to select a configuration of computing resources for executing the application. In particular, the configuration selection unit 14 is configured to perform a selection process in order to select a configuration of computing resources from among the configurations detailed in the available resource information which will meet, or come closest out of the available configurations to meeting, the performance targets. The configuration selection unit is configured to use the application execution scalability information to predict which of the available configurations will meet, or come closest to meeting, the performance targets.

For example, the configuration selection unit 14 may be configured to generate a set of optimization problems based on the performance target, in which the variable space is defined by the available configurations, and the performance targets provide constraints which the chosen variables must satisfy, and possibly also a metric for selecting an optimum configuration from among a plurality which satisfy the constraints. Algorithms for solving optimization problems are an established and ongoing field of research. For example, algorithms which implement Newton's method for solving optimization problems could be used by the configuration selection unit 14.

As an alternative or additional process to selecting a configuration of types and amounts of categories of computing resource to execute the application prior to execution commencing, the configuration selection unit 14 may perform the selection process during execution of the application. For example, the application execution controller 10 may respond to a change in available resource information, application execution scalability information, or performance target information, by re-performing the process of selecting a configuration and instructing the computing environment to execute on the selected configuration. Therefore, the application execution controller 10 is responsive and the configuration selection is flexible.

Once a configuration has been selected by the configuration selection unit 14, the configuration selection unit 14 is configured to notify the instructing unit 16 of the selected configuration. The instructing unit 16 is configured to issue an instruction or set of instructions to the computing environment 20 executing the application in order to realize the selected configuration of computing resource. The instructing unit 16 may simply send details of the selected configuration to the computing environment, possibly along with information identifying the particular execution of the application. The instructing unit may divide the instructing into a list of one or more actions which the computing environment must perform in order to realize the selected configuration. For example, migrate the application from node A to node B, dedicate an additional core to the execution, increase the amount of hard disk space made available to the execution.

Figure 2:
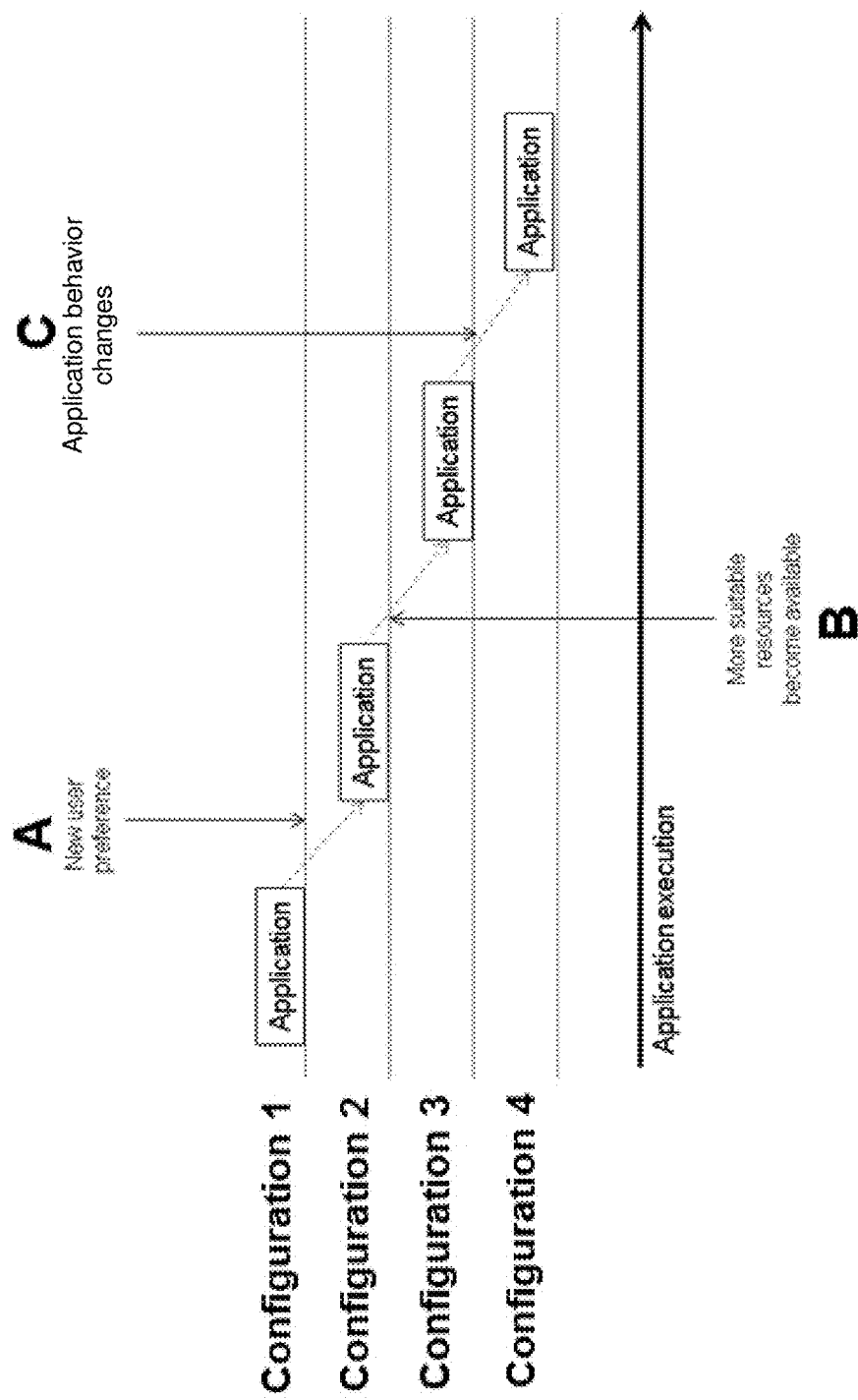
FIG. 2 is an illustration of the technical effect of the process performed by an application execution controller embodying the present invention.

FIG. 2 is an illustration of the technical effect of the process performed by an application execution controller 10 such as that illustrated in FIG. 1. Specifically, the application execution controller 10 whose effect is illustrated in FIG. 2 is one which is configured to obtain new information during the execution of the application, and to perform the selection of the optimum configuration again as a consequence of receiving the new information.

FIG. 2 illustrates a representation of the execution of an application in a computing environment containing four different resource configurations. For example, it may be that there are four different types of a particular category of computing resource, or that there are two different amounts of a first category of resource and two different types of a second category of resource, so that four configurations are available. At the start of the execution, the information is obtained and the configuration 1 is selected to execute the application, the computing environment 20 is instructed to begin executing the application on resources specified in configuration 1. For example, configuration 1 could mean one core of a 4-core Intel Xeon machine with 8 GB of RAM.

At some point A during the execution of the application, the user specifies a new execution preference, which is interpreted by the information collecting unit 12 as new performance target information. For example, the user may decide to execute of the application as fast as possible. The information collecting unit 12 may also request or obtain new available resource information and new application execution information in response to receiving the new performance target information. Using the most recent versions of the information, the configuration selection unit decides to migrate the application to Configuration2 which, for example, could be all 4 cores of the same machine.

At a following point B in the execution of the application, the information collecting unit 12 obtains new available resource information notifying that a new resource configuration, configuration 3, having two 8-core Intel Xeon processors and 48 GB RAM, has become available. In accordance with the most recent performance target information, that is to execute the application as quickly as possible, the configuration selection unit 14 selects configuration 3 as the optimum configuration on which to continue executing the application, and the instructing unit 16 instructs the computing environment 20 to migrate the application to Resource type 3.

At yet another point C during the execution of the application, the application notifies the computing environment 20 that it has entered a different execution mode, one where I/O operations to the Hard Disk are dominant while CPU power is no longer required, and the computing environment notifies the application execution controller 10 accordingly. The information collecting unit 12 is configured to collect new application execution scalability information consistent with the part of the application which is being (or is about to be) executed. The new information is transferred to the configuration selection unit 14, which now finds that the optimum configuration is no longer configuration 3, which was tailored to provide high processing power, but that the optimum configuration is now configuration 4. The most recent performance target information is still to execute the application as quickly as possible, and configuration 4, only has two cores but is equipped with SSD type storage which results in much better I/O performance. Thus, the instructing unit 16 instructs the computing environment 20 to migrate the application to configuration 4.

Figure 3:
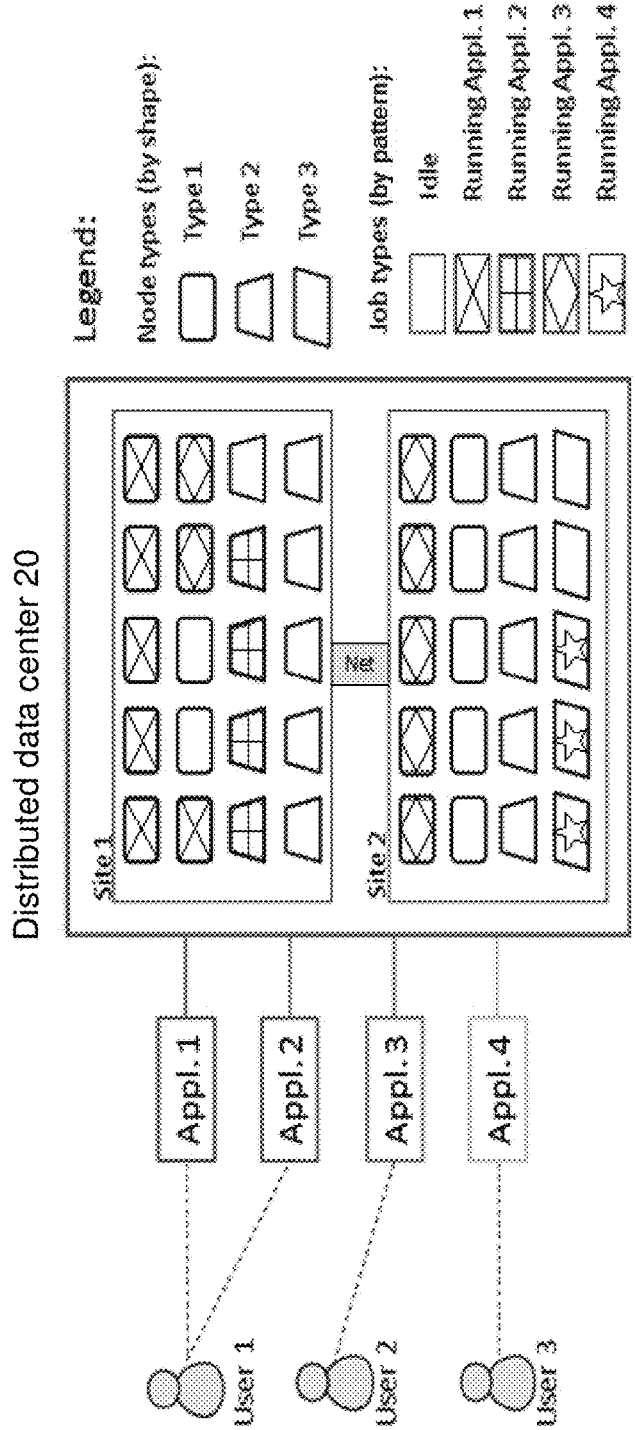
FIG. 3 provides an overview of a system architecture in which invention embodiments can be implemented.

FIG. 3 provides an overview of a system architecture in which invention embodiments can be implemented. The application execution controller is not illustrated in FIG. 3, but is available to the distributed data centre 20, which is exemplary of the computing environment mentioned elsewhere in this document, as a service.

A number of users (here denoted with User 1-3) connect remotely to one or more applications (here denoted with Appl. 1-4) provided as services by the distributed data centre 20. The users may interact with such applications via a Web browser; however other ways like via a Terminal application are also possible.

While the applications could have a part running on the user's local machine, in general most or the entire application is executed remotely, on one or more machines located at a site of the distributed data centre 20. Such sites can be located either inside the organization the user belongs to, as it in the case of private clouds or internal enterprise applications, or hosted by a third party, like in the case of public clouds. The data centre 20 of FIG. 3 is composed of multiple sites (here denoted Site 1-2) placed in multiple geographical locations and linked either by fast optical network connections or simply via the Internet. This is, of course, only exemplary of possible system architectures, and a computing environment in an embodiment of the present invention could be a data centre based at a single site. Applications can run on one or more machines placed in any one site or can run on machines spanning multiple sites, with the latter approach being taken, for example, in order to improve responsiveness by being geographically closer to the user.

FIG. 3 illustrates a computing environment in which there are three different available resource configurations, wherein each node type represents a different configuration of resources. The different node types (configurations of computing resources) are denoted by different shaped nodes. Furthermore, the legend indicates which job types (i.e. which application) is being executed, if any, on each node of the distributed data centre 20. The application execution controller is responsible for selecting a node for a particular job.

Figure 4:
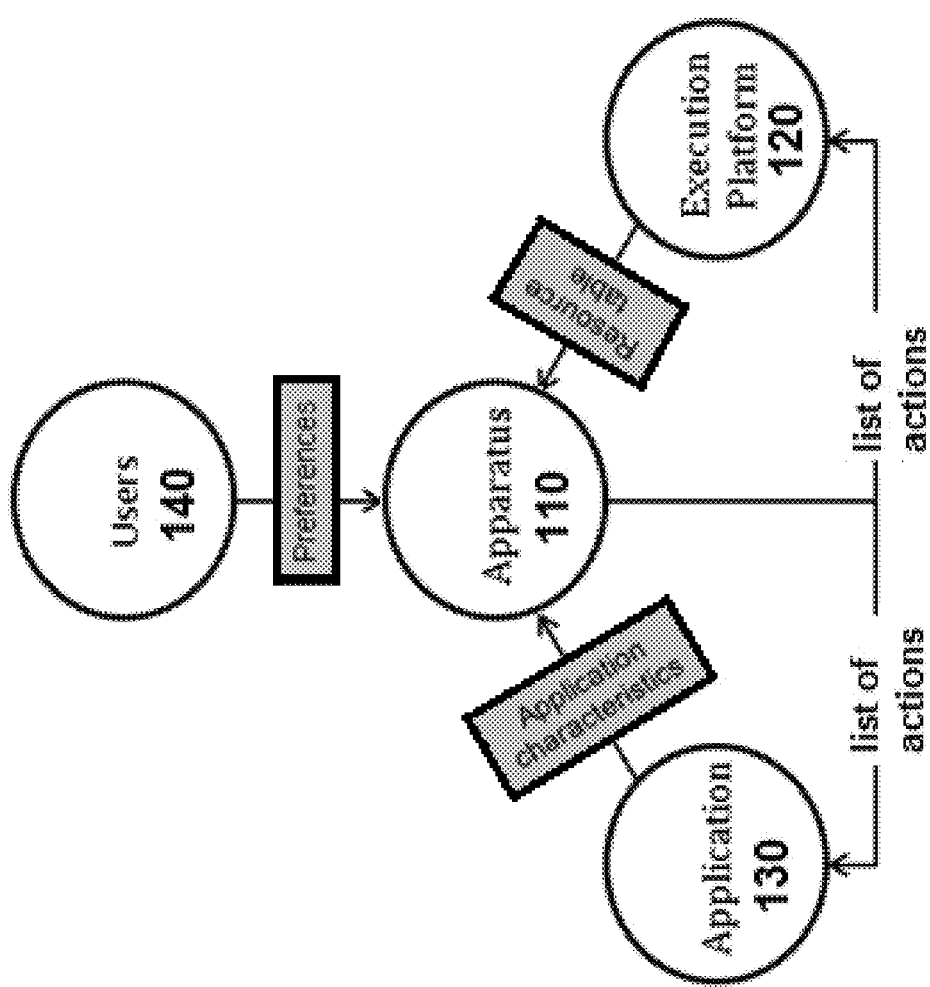
FIG. 4 illustrates an overview of an apparatus embodying the present invention.

FIG. 4 illustrates an overview of an apparatus embodying the present invention and its interaction with users 140, the application 130, and the execution platform 130.

The apparatus 110 is exemplary of the application execution controller referred to elsewhere in this document. Of course, although it is referred to as an 'apparatus' in this example, it is not limited to a hardware implementation, and the apparatus in question may be a computing device executing a program causing it to function as said 'apparatus'. The example illustrated in FIG. 4 demonstrates how, in invention embodiments, the application 130 and execution platform 120 work cooperatively via a central apparatus 110, towards optimizing the choice of computing resources used to execute the application in accordance with the preferences expressed by users 140.

The execution platform 120 is exemplary of the computing environment mentioned elsewhere in this document, and the resource table is exemplary of available resource information. The execution platform 120 is configured to provide information about the current state of the system in terms of available resources in the form of a resource table. The resource table contains information about the amount and type of resources available in the system (the execution platform) and is accompanied by additional information such as the cost of said resources.

The application 130 is an exemplary application, and the application characteristics are exemplary of the application execution scalability information. The application 130 provides information to the apparatus 110 about its inner-workings. These data include a quantitative description of the way in which execution variables, which may also be referred to as state variables, e.g. RAM, HDD space, number of cores, impact on the execution time of the application. Moreover, the data provide clear information about the degrees of freedom available to the apparatus 110 in selecting a configuration of resources to execute the application (e.g. the execution time is sensitive to modifying the number of nodes, increasing HDD space allocation, or to moving to a different generation of CPUs).

The lists of actions are exemplary of the instructions.

The users 140 are a source of user preferences, which are exemplary of the performance target information referred to elsewhere in this document. The user preferences express information about the way the user would like the application to be executed. How they are treated in terms of importance is implementation specific. For example, they may be treated as imperative, or they may be treated as non-imperative. If they are treated as non-imperative, then it may be that a configuration of resources is selected by the apparatus 100 which does not satisfy that preference.

The apparatus 110 is configured to optimize the execution of the application by taking as inputs the user preferences, the application characteristics, and the resource table, and outputting a list of actions that serve to improve the execution of the application in terms of satisfying the user preferences. The list of actions are forwarded to the execution platform 120 and/or the application 130.

Following receipt of the list of actions, if they specify use of a configuration of resources for executing an application which do not match the current configuration of resources being used to execute the application, some migration of the application may be performed, or re-allocation of resources. Consequently, an allocation of resources to executing the application is achieved which better satisfies the user preferences.

Figure 5:
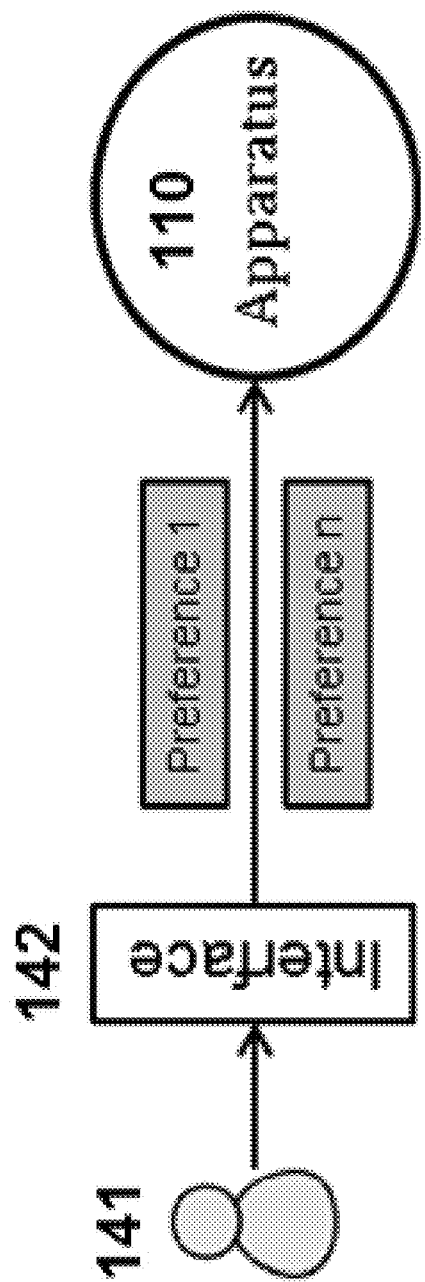
FIG. 5 illustrates an example of how performance target information may be collected in invention embodiments.

FIG. 5 illustrates an example of how performance target information may be obtained. FIG. 5 provides more detail on the interaction between users 140 and the apparatus 110 in the example of FIG. 4. The user 141 and interface 142 may collectively be referred to as "a user", since it is implicit elsewhere in this document that a user be provided some means (i.e. an interface) of interacting with the computing environment on which the application is to be executed.

A user 141 and interface 142 are provided as examples of an entity on behalf of which an application is executed at the execution platform 120. Of course, it may be that the user 141 is actually a machine timed or configured to request execution of an application at certain timings or prompted by certain trigger events. A user 141, of whatever form, expresses a preference regarding an execution of an application via messages sent to the Apparatus 110 via an interface 142. The interface 142 provides a means for the apparatus 110 to obtain information from the user 141, and may provide a means of codifying or formalizing that information. For example, a user 141 may select a preference from a list of preferences presented in a GUI (as an example of an interface 142) or by typing the preference in a Terminal (as a further example of an interface 142). More than one preference can be selected during the lifetime of an execution, and the preferences can be selected at multiple time points during the execution. Moreover, if a later preference contradicts a previous one, the older preference will be discarded by the apparatus 110 and a configuration of resources selected on the basis of the newer preference.

Examples of preferences relevant for executing applications on an execution platform 120 such as a cloud environment are as follows:
  Maximize application performance (i.e. maximize execution rate, minimize execution time);
  Minimize running cost (whether that be a financial cost of the service or a cost in terms of $CO_2$ generation);
  Minimize running cost within a fixed maximum cost;
  Minimize energy consumption.

Figures 6, 7:
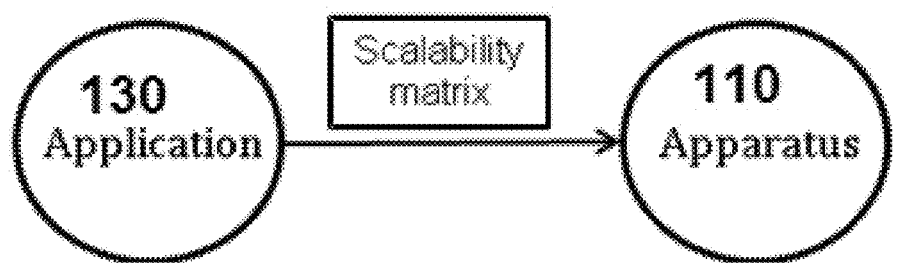
FIG. 6 illustrates an example of how application execution scalability information may be collected in invention embodiments.
FIG. 7 illustrates an example of application execution scalability information.

FIG. 6 illustrates an example of how application execution scalability information may be collected. FIG. 6 provides more detail on the interaction between the application 130 and the apparatus 110 in the example of FIG. 4. The application execution scalability information is provided in the exemplary form of a scalability matrix. The source of the scalability matrix is illustrated as the application 130, however, depending on the implementation details, an application 130 may not exist as an entity from which information such as a scalability matrix can be provided, but may be merely a set of algorithms and logical instructions to be performed by a processor and associated components. However, the application 130 is exemplary of a storage unit or other information source, which may be at the apparatus 110, at the execution platform 120, at the user 140, or elsewhere, from which information about executing the application can be obtained.

The scalability matrix is a simple, compact and efficient format for expressing application execution scalability information. The scalability matrix includes an entry for each pairing of execution variables including time (or execution rate) and at least one category of computing resource. The entry represents the impact of changing the amount or type of one of the pair on the amount or type of the other required to execute the application. Hence, a non-zero entry represents some correlation, or a coupling, between one execution variable and another. At the start of an execution, the scalability matrix is obtained by the apparatus 110 from the application 130. Alternatively, the scalability matrix can be read from a third party module, such as a database.

The scalability matrix may represent first order (i.e. linear) relationships between execution variables, or may be configured to contain more than one entry per execution variable pairing in order to represent more complex relationships. In this example, a first order scalability matrix is considered. The exemplary first order scalability matrix has the following properties:
  it is square and symmetric;
  one entry is always execution time (or execution rate);
  all other entries are categories of computing resource (e.g. RAM, CPU cores, Nodes, etc)
  entry (IA contains the dependence of execution time or state variable I of state variable J in the form of a scaling coefficient.

FIG. 7 illustrates an exemplary first order scalability matrix. The matrix contains the execution time (Time) plus four state variables: HDD performance (HDD), Memory size (RAM), the number of cores per CPU socket (Cores) and the number of nodes (Nodes). HDD, RAM, Cores, and Nodes are examples of categories of computing resource. Specifically, they are categories of computing resource in which a type or amount of that category of resource can be selected for use in executing the application.

The first row shows how the execution time depends on the state variables. In the example of FIG. 7, the fact that a change in HDD performance or available RAM does not impact on the execution time is represented by a "0" entry. On the other hand, the execution time is strongly influenced by the number of cores and number of nodes. A value of "1" or "−1" represents perfect scalability, wherein the negative sign indicates decrease. For example, the "−1" value for Cores shows the fact that a doubling in the number of cores will halve the execution time.

The second row shows that there is no coupling between the HDD performance and the rest of the execution variables while the third row indicates that the amount of available RAM scales perfectly with the number of nodes, e.g. a doubling of the number of nodes results in half the needed RAM.

The entries of the 1st order scalability matrix are a numerical indication of the linear part of the scalability curves of the scaling relationship between two execution variables. For a more accurate representation of the scaling relationship (dependence), higher order terms can be added to the 1st order terms resulting in higher order scalability matrices.

An additional state variable which may also be, but is not necessarily included in the scalability matrix, is the Cost (which may be a financial cost of the service or a $CO_2$ cost of the execution). Depending on the cost policy of the execution environment 120, some of the execution variables may be related to Cost, where the values are received with the available resource information, e.g. the resource table, from the execution environment 120. For example, the number of cores, the number of nodes and the size of the data stored on the HDD may incur a cost.

The scalability matrix serves two main purposes:
provides the apparatus 110 with a list of categories of computing resource for which the selection of an amount or type of resource within that category affects the execution of the application. These are the execution variables whose value in the scalability matrix is non-zero;
guides the configuration selection procedure conducted by the apparatus 110 by providing quantitative values for the correlations or couplings between execution time and categories of computing resource from which a type or amount of that category of resource is selectable for the execution.

Representing dependencies not only between execution time and categories of resource, but also between pairs of categories of resource themselves allows for satisfying performance targets of the type "minimize RAM usage" or "minimize disk usage".

Figure 8:
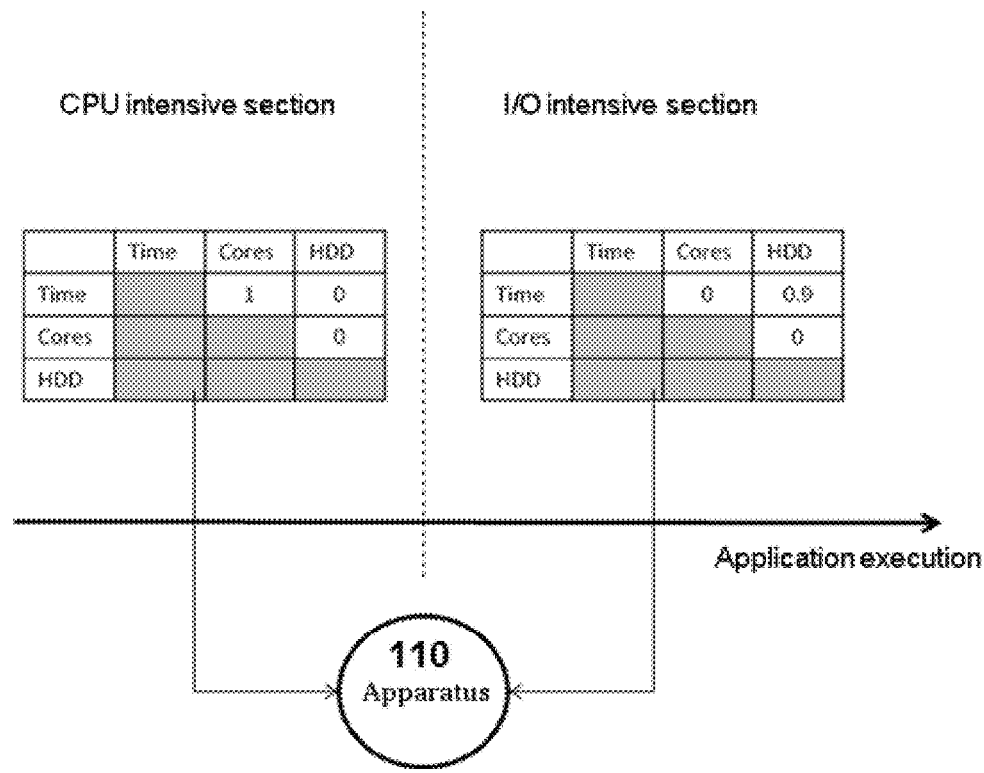
FIG. 8 illustrates how application execution scalability information can be modified during execution of an application.

For a specific application, a scalability matrix can be created either from benchmarks conducted by the developer or from previous knowledge related to the particular type of algorithm that is being used. Moreover, updated scalability matrices can be sent to the apparatus 110 when the application enters a different execution mode. FIG. 8 illustrates how a scalability matrix can change during execution of an application. On the left-hand scalability matrix, the number of cores scales perfectly with execution time, because the application being executed is processing-intensive at that stage. On the right-hand scalability matrix, the number of cores does not scale with execution time, but the available hard disk space does (although the scalability is moderated by a factor of 0.9).

Figure 9:
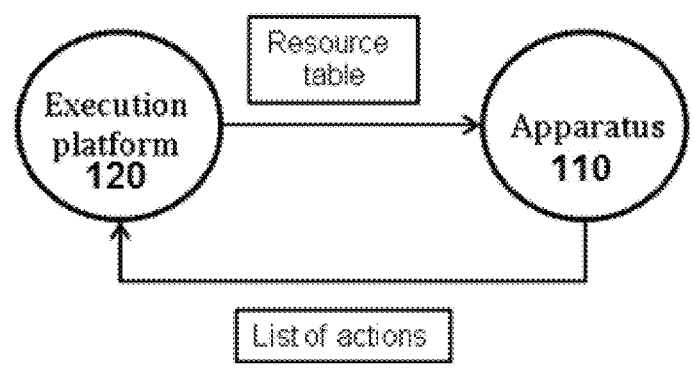
FIG. 9 illustrates an example of how available resource information may be collected.

FIG. 9 illustrates an example of how available resource information may be collected. FIG. 9 provides more detail on the interaction between the execution platform 120 and the apparatus 110 in the example of FIG. 4. In this particular example, available resource information is exemplified by a resource table. Furthermore, the instructions issued by the instructing unit to the computing environment are exemplified by a list of actions issued to the execution platform 120 by the apparatus 110.

The execution platform 120 may be the computing environment on which the application is executed, or more specifically may be the management infrastructure underlying the computing environment. The execution platform 120 is configured to provide the apparatus 110 with available resource information presented as a list of available computing resources both prior to execution being initiated, and during execution in response to a change in available computing resources or in response to a request for such information from the apparatus 110. The list of available resources may be accompanied by details such as hardware specifications of the available resources and costs associated with using the available resources.

The apparatus 110, having performed a selection of a configuration of computing resources from the available computing resources in order to best satisfy the performance targets, is configured to respond by instructing the execution platform 120 to implement the selected configuration. Hence, the instructing may take the form of issuing a migration action, or list of actions. Upon receiving a migration action from the apparatus 110, the execution platform 120 is configured to migrate the executing application to (or to initiate execution of the application on) the selected configuration of computing resources. The migration may be performed using migration technologies such as live migration technology or checkpoint-based migration technology.

Figure 10:
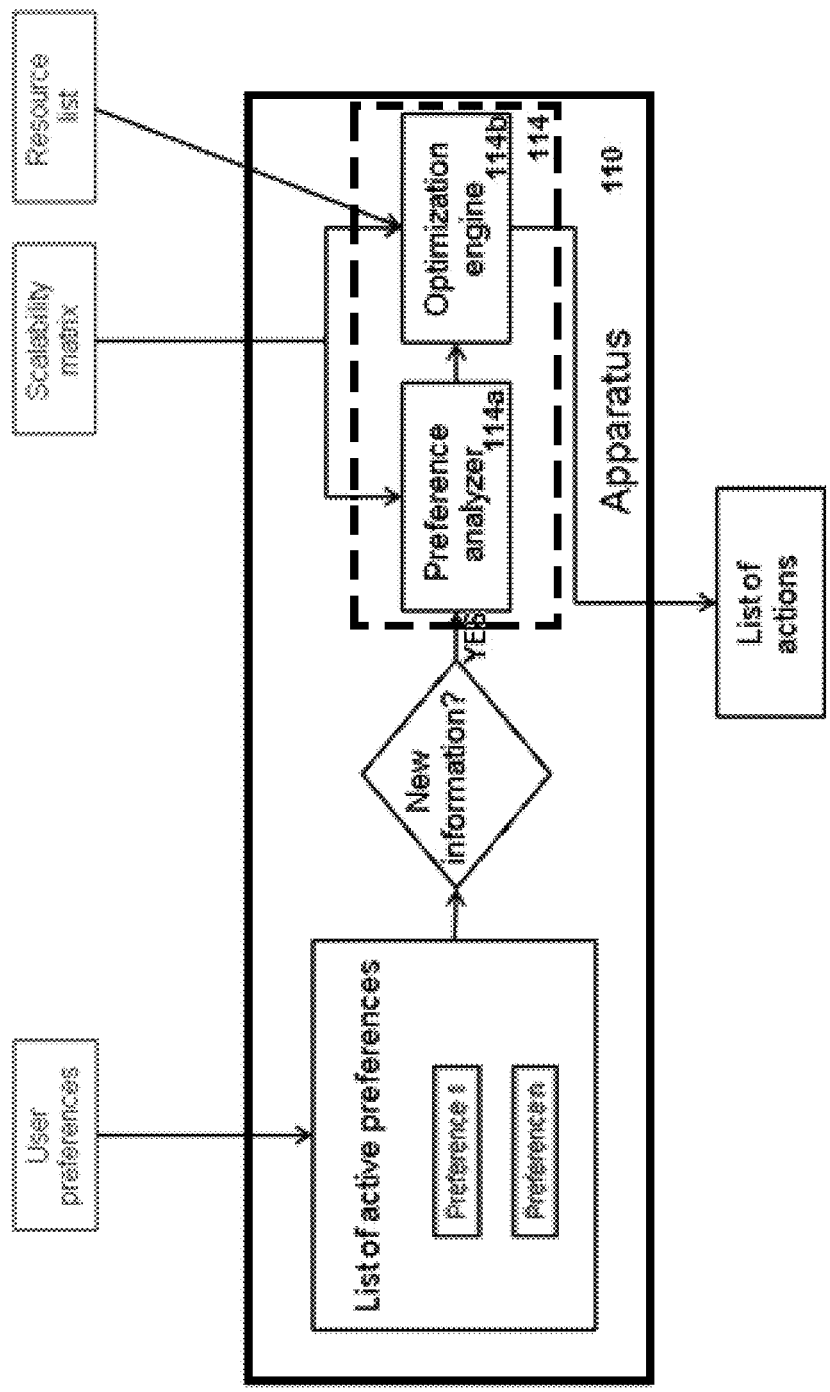
FIG. 10 illustrates an exemplary flow of information in an apparatus embodying the present invention.

FIG. 10 illustrates an exemplary flow of information in the apparatus 110 of FIG. 4. FIG. 10 primarily illustrates the flow of information, and hence not all of the components are shown. The apparatus 110 of FIG. 4 is exemplary of the application execution controller 10 of FIG. 1, and hence includes an information collecting unit, a configuration selection unit, and an instructing unit. However, the information collecting unit and instructing unit are not illustrated in FIG. 10. In the apparatus 110 of FIG. 10, an exemplary configuration selection unit 114 is composed of a preference analyzer 114a and an optimization engine 114b. The information collecting unit is not illustrated, but is responsible for receiving the scalability matrix, the resource list, and the user preferences, for maintaining the list of active preferences, and for checking whether or not new user preferences are received. The instructing unit is not illustrated, but is responsible for issuing the list of actions.

The apparatus is configured to combine user preference information, application characteristics (expressed via a scalability matrix) and available resource data in order to generate a list of actions that, if implemented by the execution platform 120 and/or the application 130, cause the application to execute in a way that matches (or is as close as possible to) user preferences.

The apparatus receives user preferences. These are compared with a list of active preferences. If the execution is being initiated, there will be no active preferences in the list. If the execution of the application is underway, then the user preferences used to select the configuration of resources on which the application is being executed are maintained in the list. If the received user preferences contradict user preferences in the list, or add a new user preference, then it is deemed that there is new information. The user preferences are transferred to the preference analyzer 114a of the configuration selection unit 110.

The apparatus 110 may operate in a reactive manner (event driven), performing actions every time the input data (i.e., user preferences, scalability matrix or resource list) changes. When such a change happens, the apparatus performs the following steps:

1. Uses the preference analyzer 114a to analyze the type of preferences (are they constraints or selection discriminators) and combine them into independent preference groups (based on whether or not the execution variables on which the preferences are based are indicated as correlated or coupled in the scalability matrix). The preference analyzer 114a uses the scalability matrix to divide the received user preferences into independent groups, which are then forwarded to the optimization engine 114b. The scalability matrix may be obtained in response to the user preferences being received.

2. The optimization engine 114b receives the independent groups of user preferences, and in response to that receipt or otherwise, collects a resource list. The optimization engine 114b is configured to derive an independent problem from each independent group of user preferences, and, using information from the scalability matrix, to determine which configuration of available resources best solves the collective optimization problem composed of the independent problems.

3. The optimization engine 114b converts the result of the optimization problem into an instruction or list of actions.

4. An instruction to execute the application on the determined configuration of computing resources is then issued.

More detail will now be provided on the process outlined above.

The preference analyzer is configured to divide the preferences into independent groups. This may be done using the following three step process:

1. Categorize preferences into "intent-type" (which are exemplary of selection discriminators mentioned elsewhere) and "constraint-type". Intent-type preferences are qualitative statements about the way the user wishes the application to run. Examples of intent-type preference are: "Solve as fast as possible" or "Minimize disk usage". Constraint type preferences are quantitative statements about execution time and/or execution variables. Examples of constraint-type preferences are "Keep the cost under 10$/hour" or "Keep disk usage under 100 GB".

2. Group preferences into independent sets. The apparatus 110 uses the coupling information between execution variables found in the scalability matrix to group intent-type preferences into independent sets. Independent in this context is taken to mean that if S1 and S2 are two independent sets of preferences then all intent-type preferences in S1 are coupled (via the execution variables on which they are based being represented as coupled in the scalability matrix) and so are the ones in S2 but there is no coupling between any pairs of intent-type preferences taken from S1 and S2.

3. For each independent set, add related constraint-type preferences. For each intent-type preference from each independent set created at the previous step, the apparatus 110, or specifically the preference analyzer, looks for related constraint-type preferences and adds them to the set. Here, related is taken to mean preferences for which the underlying execution variables are coupled in the scalability matrix. After the preferences have been grouped into independent sets, they are transferred to the optimization engine 114b which forms a (usually non-linear) constrained optimization problem using the independent sets collectively, and solves the constrained optimization problem using an optimization problem solving method/algorithms such as Newton's method. The solution to this problem is converted into a list of actions that are sent to the execution platform and/or to the application.

A description of two implementations of embodiments of the present invention will now be presented.

In a first implementation example, the application is a matrix solver and the computing environment is a cloud computing environment in which clusters of multi-core CPUs can be allocated to tasks. Such matrix solvers are the main component of Computed Aided Engineering (CAE), for example for performing structural analysis or computational fluid dynamics.

For this implementation, the following execution variables are considered and some or all are represented in each of the available resource information, performance target information, and the application execution scalability information: HDD (hard disk usage), RAM (memory usage), Gen (CPU generation), Cores (number of cores per CPU), Nodes (number of nodes allocated to the job).

We make the additional assumption that it is possible to scale the solver to an arbitrary number of cores and nodes.

Upon the request for an execution of the application being registered or notified to the application execution controller, the application, or a software routine on behalf of the application, uses prior information related to executions of the matrix solver in similar implementations, for example based on the computational characteristics of the numerical method being used, to build a 1st order scalability matrix. FIG. 11 presents an example of such a 1st order scalability matrix.

The first row of the execution matrix shows how the execution time depends on the CPU generation, the number of cores per node and the number of nodes in the cluster. The Gen=−1 expresses the fact that the application makes full use of the computing power of the CPU, either floating point or memory bandwidth. Hence, migrating the application to a core considered twice as fast will halve the execution time. The Cores=−0.8 entry describes a 80% scalability when increasing the number of cores. This implies 1.6× speedup for 2 cores, 3.2 speedup for 4 cores and so on. Finally, Nodes=0.9 extends the same process to the inter-node scalability, where part of the speedup is lost due to communication.

The second row shows that there is no coupling between the HDD space used by the solver and the other execution variables.

The third row shows the fact that the RAM usage is coupled to the number of nodes. This occurs due to the problem data being partitioned between nodes and each node holding only a subset of the overall problem data. Hence, if the number of nodes is doubled, only half of the RAM would be needed.

The next two lines show that there is no connection between the type of CPU core, the number of cores and the number of nodes.

The available resource information may be provided in the form of a resource table, for example, the execution platform may provide the apparatus periodically with an updated resource table. An example of such a table for a three-tiered execution environment is shown in FIG. 12, that is to say, there are three different available configurations of computing resources available to execute the application—type 1, type 2, and type 3.

The platform can provide nodes with three types of cores, denoted by Type 1-Type 3. Type 1 nodes are the slowest (Generation 1—e.g. Intel Core architecture) and also the cheapest, at a 0.1$/core/hour. Type 2 nodes are medium performance nodes (Generation 2—e.g. Intel Core2 architecture) and more expensive to run, at 0.2$/core/hour. hour. However, up to 4 cores of this type can be used as a SMP system. The fastest type of CPU is Type 3 (Generation 4—e.g. Intel Nehalem architecture), which is the most expensive to run, at 0.3$/core/hour. However, up to 12 cores can be run as an SMP. The above costs and model names are merely used to exemplify how embodiments of the present invention may be implemented, and are not reflective of actual performance and cost of processors.

Currently, the available HDD space that can be allocated to the user is 100 GB, at a cost of 0.1$/GB In this implementation example, the performance target information is a list of preferences sent by the user. An example of such a list is as follows:
1. Minimize execution time
2. Keep the cost under 10$/hour
3. Minimize disk usage Once the information is obtained, the configuration selection unit is configured to select a configuration to execute the application. In this implementation example, that process is carried out in four steps, as set out below:

Step 1: Categorize preferences into "intent-type" and "constraint-type"

Preference 1 and 3 are intent-type (selection discriminators) while preference 2 is constraint-type.

Step 2: Group preferences into independent sets

The configuration selection unit refers to the scalability matrix and based on the information contained therein groups the intent-type preferences into independent sets. "Minimize execution time" is a related to Time while "Minimize disk usage" is related to HDD. The two preferences are not represented as coupled in the application execution scalability information (scalability matrix—see FIG. 11), since the "HDD" entry in the "Time" column is zero. Hence, preferences "1" and "3" are independent.

Step 3: For each independent set, add related constraint-type preferences

For each set of independent intent-type preferences, the configuration selection unit then adds related constraint-type preferences. From the scalability matrix it knows that "Time" is related to "Nodes" and "Cores", which are known by default to be related to "Cost". Also by default it is known that "HDD" is related to cost. Hence, preference "2" is related to both preferences 1 and 3.

The result of the third step is two independent sets of preferences: {1,2} and {3,2}.

Step 4: Solve optimization problems and generate a list of actions

The set {1,2} is equivalent to the following optimization problem: "Minimize execution time, with the constraint that cost<=10$/hour". The problem is solved using an appropriate solver package and the solution is converted to a list of actions. For example: "Scale to 12 nodes×4 cores and migrate to type 2 nodes".

The set {3,2} is equivalent to the following optimization problem "Minimize disk usage, with the constraint that cost<=10$/hour". In this case, the HDD usage does not impact on other variables, so the resulting action is "Minimize disk usage". However, in the available resource information, only one option is presented for HDD, so no action is required.

Hence, the end result is that the execution environment is instructed to scale the execution of the matrix solver application to 12 nodes with 4 cores each and migrate to type 2 nodes. The execution environment performs the migration, and hence the execution of the application continues in a way which best matches the user preferences.

A further implementation example highlighting an additional benefit which can be derived in computing environments which implement instructions from an application execution controller embodying the present invention.

The scalability matrices can be used by the management infrastructure underlying the computing environment to efficiently schedule multiple applications on the same node. High (which may be defined as, for example, over a threshold, or merely non-zero) values for an execution variable in the Time row of the scalability matrix shows a strong sensitivity of the application to that particular type of hardware while a low (which may be defined as, for example, under a threshold, or zero) value shows the opposite. Using this information, the management infrastructure can allocate applications with high values and low values for a particular state variable to a particular machine or node in order to increase efficiency. For example, CPU-intensive application can be scheduled on the same nodes with HDD-intensive applications. Thus, bottlenecks in performance at particular machines or nodes can be obviated.

Figure 13:
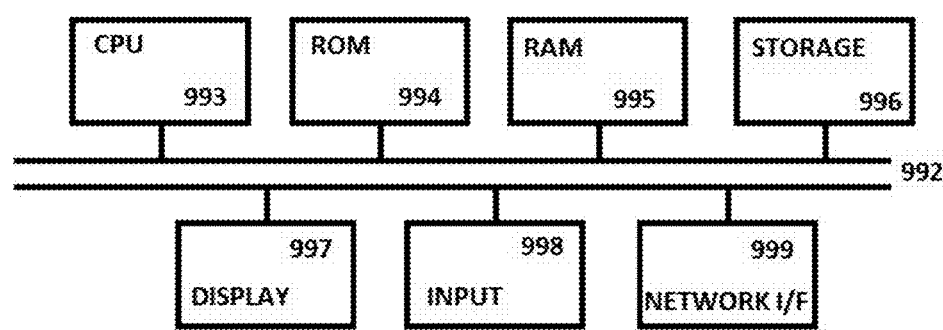
FIG. 13 illustrates a hardware configuration of a computing device of an embodiment.

The application execution controller 10 may be embodied as functionality realized by a computing device such as that illustrated in FIG. 13. The functionality of the application execution controller 10 may be realized by a single computing device or by a plurality of computing devices functioning cooperatively via a network connection. An apparatus 110 of an embodiment may be realized by a computing device having the hardware setup shown in FIG. 13. Methods embodying the present invention may be carried out on, or implemented by, a computing device such as that illustrated in FIG. 13. One or more such computing devices may be used to execute a computer program of an embodiment. Computing devices embodying or used for implementing embodiments need not have every component illustrated in FIG. 13, and may be composed of a subset of those components. A method embodying the present invention may be carried out by a single computing device in communication with one or more data storage servers via a network.

FIG. 13 is a block diagram of a computing device, such as a data storage server, which embodies the present invention, and which may be used to implement a method of an embodiment. The computing device comprises a computer processing unit (CPU) 993, memory, such as Random Access Memory (RAM) 995, and storage, such as a hard disk, 996. Optionally, the computing device also includes a network interface 999 for communication with other such computing devices of embodiments. For example, an embodiment may be composed of a network of such computing devices. Optionally, the computing device also includes Read Only Memory 994, one or more input mechanisms such as keyboard and mouse 998, and a display unit such as one or more monitors 997. The components are connectable to one another via a bus 992.

The CPU 993 is configured to control the computing device and execute processing operations. The RAM 995 stores data being read and written by the CPU 993. The storage unit 996 may be, for example, a non-volatile storage unit, and is configured to store data.

The display unit 997 displays a representation of data stored by the computing device and displays a cursor and dialog boxes and screens enabling interaction between a user and the programs and data stored on the computing device. The input mechanisms 998 enable a user to input data and instructions to the computing device.

The network interface (network I/F) 999 is connected to a network, such as the Internet, and is connectable to other such computing devices via the network. The network I/F 999 controls data input/output from/to other apparatus via the network.

Other peripheral devices such as microphone, speakers, printer, power supply unit, fan, case, scanner, trackerball etc may be included in the computing device.

After the preferences have been grouped into independent sets, they are transferred to the optimisation engine 114*b* which forms a (usually non-linear) constrained optimisation problem using the independent sets collectively, and solves the constrained optimisation problem using an optimisation problem solving method/algorithms such as Newton's method. The solution to this problem is converted into a list of actions that are sent to the execution platform and/or to the application.

A description of two implementations of embodiments of the present invention will now be presented.

In a first implementation example, the application is a matrix solver and the computing environment is a cloud computing environment in which clusters of multi-core CPUs can be allocated to tasks. Such matrix solvers are the main component of Computed Aided Engineering (CAE), for example for performing structural analysis or computational fluid dynamics.

For this implementation, the following execution variables are considered and some or all are represented in each of the available resource information, performance target information, and the application execution scalability information: HDD (hard disk usage), RAM (memory usage), Gen (CPU generation), Cores (number of cores per CPU), Nodes (number of nodes allocated to the job).

We make the additional assumption that it is possible to scale the solver to an arbitrary number of cores and nodes.

Upon the request for an execution of the application being registered or notified to the application execution controller, the application, or a software routine on behalf of the application, uses prior information related to executions of the matrix solver in similar implementations, for example based on the computational characteristics of the numerical method being used, to build a 1st order scalability matrix. FIG. 11 presents an example of such a 1st order scalability matrix.

The first row of the execution matrix shows how the execution time depends on the CPU generation, the number of cores per node and the number of nodes in the cluster. The Gen=−1 expresses the fact that the application makes full use of the computing power of the CPU, either floating point or memory bandwidth. Hence, migrating the application to a core considered twice as fast will halve the execution time. The Cores=−0.8 entry describes a 80% scalability when increasing the number of cores. This implies 1.6× speedup for 2 cores, 3.2 speedup for 4 cores and so on. Finally, Nodes=0.9 extends the same process to the inter-node scalability, where part of the speedup is lost due to communication.

The second row shows that there is no coupling between the HDD space used by the solver and the other execution variables.

The third row shows the fact that the RAM usage is coupled to the number of nodes. This occurs due to the problem data being partitioned between nodes and each node holding only a subset of the overall problem data. Hence, if the number of nodes is doubled, only half of the RAM would be needed.

The next two lines show that there is no connection between the type of CPU core, the number of cores and the number of nodes.

The available resource information may be provided in the form of a resource table, for example, the execution platform may provide the apparatus periodically with an updated resource table. An example of such a table for a three-tiered execution environment is shown in FIG. 12, that is to say, there are three different available configurations of computing resources available to execute the application—type 1, type 2, and type 3.

The platform can provide nodes with three types of cores, denoted by Type 1-Type 3. Type 1 nodes are the slowest (Generation 1—e.g. Intel Core architecture) and also the cheapest, at a 0.1$/core/hour. Type 2 nodes are medium performance nodes (Generation 2—e.g. Intel Core2 architecture) and more expensive to run, at 0.2$/core/hour. However, up to 4 cores of this type can be used as a SMP system. The fastest type of CPU is Type 3 (Generation 4—e.g. Intel Nehalem architecture), which is the most expensive to run, at 0.3$/core/hour. However, up to 12 cores can be run as an SMP. The above costs and model names are merely used to exemplify how embodiments of the present invention may be implemented, and are not reflective of actual performance and cost of processors.

Currently, the available HDD space that can be allocated to the user is 100 GB, at a cost of 0.1$/GB In this implementation example, the performance target information is a list of preferences sent by the user. An example of such a list is as follows:
1. Minimize execution time
2. Keep the cost under 10$/hour
3. Minimize disk usage Once the information is obtained, the configuration selection unit is configured to select a configuration to execute the application. In this implementation example, that process is carried out in four steps, as set out below:

Step 1: Categorize preferences into "intent-type" and "constraint-type"

Preference 1 and 3 are intent-type (selection discriminators) while preference 2 is constraint-type.

Step 2: Group preferences into independent sets

The configuration selection unit refers to the scalability matrix and based on the information contained therein groups the intent-type preferences into independent sets. "Minimize execution time" is a related to Time while "Minimize disk usage" is related to HDD. The two preferences are not represented as coupled in the application execution scalability information (scalability matrix—see FIG. 11), since the "HDD" entry in the "Time" column is zero. Hence preferences "1" and "3" are independent.

Step 3: For each independent set, add related constraint-type preferences

For each set of independent intent-type preferences, the configuration selection unit then adds related constraint-type preferences. From the scalability matrix it knows that "Time" is related to "Nodes" and "Cores", which are known by default to be related to "Cost". Also by default it is known that "HDD" is related to cost. Hence preference "2" is related to both preferences 1 and 3.

The result of the third step is two independent sets of preferences: {1,2} and {3,2}.

Step 4: Solve optimization problems and generate a list of actions

The set {1,2} is equivalent to the following optimization problem: "Minimize execution time, with the constraint that cost<=10$/hour". The problem is solved using an appropriate solver package and the solution is converted to a list of actions. For example: "Scale to 12 nodes×4 cores and migrate to type 2 nodes".

The set {3,2} is equivalent to the following optimization problem "Minimize disk usage, with the constraint that cost<=10$/hour". In this case, the HDD usage does not impact on other variables, so the resulting action is "Minimize disk usage". However, in the available resource information, only one option is presented for HDD, so no action is required.

Hence the end result is that the execution environment is instructed to scale the execution of the matrix solver application to 12 nodes with 4 cores each and migrate to type 2 nodes. The execution environment performs the migration, and hence the execution of the application continues in a way which best matches the user preferences.

A further implementation example highlighting an additional benefit which can be derived in computing environments which implement instructions from an application execution controller embodying the present invention.

The scalability matrices can be used by the management infrastructure underlying the computing environment to efficiently schedule multiple applications on the same node. High (which may be defined as, for example, over a threshold, or merely non-zero) values for an execution variable in the Time row of the scalability matrix shows a strong sensitivity of the application to that particular type of hardware while a low (which may be defined as, for example, under a threshold, or zero) value shows the opposite. Using this information, the management infrastructure can allocate applications with high values and low values for a particular state variable to a particular machine or node in order to increase efficiency. For example, CPU-intensive application can be scheduled on the same nodes with HDD-intensive applications. Thus, bottlenecks in performance at particular machines or nodes can be obviated.

The application execution controller 10 may be embodied as functionality realised by a computing device such as that illustrated in FIG. 13. The functionality of the application execution controller 10 may be realised by a single computing device or by a plurality of computing devices functioning cooperatively via a network connection. An apparatus 110 of an embodiment may be realised by a computing device having the hardware setup shown in FIG. 13. Methods embodying the present invention may be carried out on, or implemented by, a computing device such as that illustrated in FIG. 13. One or more such computing devices may be used to execute a computer program of an embodiment. Computing devices embodying or used for implementing embodiments need not have every component illustrated in FIG. 13, and may be composed of a subset of those components. A method embodying the present invention may be carried out by a single computing device in communication with one or more data storage servers via a network.

FIG. 13 is a block diagram of a computing device, such as a data storage server, which embodies the present invention, and which may be used to implement a method of an embodiment. The computing device comprises a computer processing unit (CPU) 993, memory, such as Random Access Memory (RAM) 995, and storage, such as a hard disk, 996. Optionally, the computing device also includes a network interface 999 for communication with other such computing devices of embodiments. For example, an embodiment may be composed of a network of such computing devices. Optionally, the computing device also includes Read Only Memory 994, one or more input mechanisms such as keyboard and mouse 998, and a display unit such as one or more monitors 997. The components are connectable to one another via a bus 992.

The CPU 993 is configured to control the computing device and execute processing operations. The RAM 995 stores data being read and written by the CPU 993. The storage unit 996 may be, for example, a non-volatile storage unit, and is configured to store data.

The display unit 997 displays a representation of data stored by the computing device and displays a cursor and dialog boxes and screens enabling interaction between a user and the programs and data stored on the computing device. The input mechanisms 998 enable a user to input data and instructions to the computing device.

The network interface (network I/F) 999 is connected to a network, such as the Internet, and is connectable to other such computing devices via the network. The network I/F 999 controls data input/output from/to other apparatus via the network.

Other peripheral devices such as microphone, speakers, printer, power supply unit, fan, case, scanner, trackerball etc may be included in the computing device.

The invention claimed is:

1. An application execution controller, configured to instruct an execution of an application in a computing environment having available to allocate to executing applications: one or both of different amounts of computing resources in a plurality of computing resource categories and different types of computing resources in a plurality of computing resource categories; the controller comprising a memory and a processor coupled to the memory, the processor being configured:

to collect available resource information detailing configurations of computing resources available to execute the application, wherein the configurations each include an indication of respective an amount and type of computing resources available in each category among the plurality of computing resource categories;

to collect application execution scalability information including, in respect of computing resources in at least one of the categories among the plurality of computing resource categories, an indication of how the one of or both of different amounts and types of computing resources in the respective computing resource category correlate with execution rate of a first portion of the application, the application execution scalability information being specific to an execution mode for the first portion of the application;

to collect performance target information including an indication of one or more performance targets for the execution of the application;

to perform a selection of a configuration from among the configurations detailed in the available resource information which, based on the application execution scalability information will come closest out of the configurations to meeting, the one or more performance targets; and to instruct the computing environment to execute the first portion of the application using the selected configuration; wherein for a change in an execution mode during the execution of the application caused by progressing from the first portion of the application to a forthcoming second portion:

the processor is configured to collect an updated version of the application execution scalability information, specific to the changed execution mode for the forthcoming second portion of the execution of the application, and to use the updated version to update a currently held version of the application execution scalability information; and using the updated version of the application execution scalability information, the processor is configured to perform an updated selection of configuration from among the configurations detailed in the available resource information which, based on the updated application execution scalability information will come closest out of the configurations to meeting the one or more performance targets specified in the performance target information; wherein the application execution scalability information is provided as a scalability matrix, the scalability matrix including an entry for each pair of factors from among factors comprising each category from among the plurality of computing resource categories and execution rate, the entry representing an effect of a proportional change along a linear scale representing usage of respective different amounts and types of a first factor from a pair of factors on the respective amount and type required of a second factor from the pair of factors, in terms of a proportional change along a linear scale representing the respective different amounts and types of the second factor, and the processor is configured to instruct the computing environment to perform the execution of the forthcoming second portion of the application using the updated selection of configuration.

2. An application execution controller according to claim 1, wherein the application execution scalability information includes, for the or each of at least one category from among the plurality of computing resource categories as a first category, an indication of how the respective different amounts and types of the first category used in executing the respective all and portion of the application correlate with a change in respective amounts or types required of at least one other category from among the plurality of computing resource categories as a consequence of changing the respective amount and type of the first category.

3. An application execution controller according to claim 1, wherein the application execution controller is configured to instruct the execution of the application prior to the start of the application execution.

4. An application execution controller according to claim 1, wherein the available resource information includes a quantitative indication of a cost of the respective amount and type of computing resources in each of the categories.

5. An application execution controller according to claim 1, wherein the processor is configured to characterize the or each of the one or more performance targets as one of constraints and selection discriminators, wherein constraints specify acceptable ranges of execution variables, and selection discriminators specify a metric for use by the configuration selection unit in comparing configurations to select one from the configurations.

6. An application execution controller according to claim 5, wherein the metric is based on an execution variable including one or more of the following: cost of the configuration; rate of execution of the configuration; and usage of one or more categories from among the categories of computing resources.

7. An application execution controller according to claim 5, wherein when the performance targets include more than one selection discriminator, processor is configured to group the selection discriminators into one or more independent groups, wherein selection discriminators specifying metrics based upon execution variables which are indicated as correlated in the application execution scalability information are grouped together, and selection discriminators specifying metrics based upon execution variables which are indicated as not correlated in the application execution scalability information are grouped apart.

8. An application execution controller according to claim 5, wherein each of the independent groups is combined with any constraints specifying an acceptable range of an execution variable which one of is or is indicated as correlated to, an execution variable upon which the metrics specified by the selection discriminators in the independent group are based to define an optimisation problem corresponding to the independent group; and the processor is configured to select a configuration by performing a solving algorithm to solve the optimisation problem.

9. A computing environment having available to allocate to executing applications one or both of different amounts of computing resources in a plurality of computing resource categories and different types of computing resources in said plurality of computing resource categories, the computing environment comprising a memory and a processor coupled to the memory and configured;

to collect available resource information detailing configurations of computing resources available to execute the application, wherein the configurations each include an indication of respective an amount and type of computing resources available in each category among the plurality of computing resource categories;

to collect application execution scalability information including, in respect of computing resources in at least one of the categories among the plurality of computing resource categories, an indication of how the one of or both of different amounts and types of computing resources in the respective computing resource category correlate with execution rate of a first portion of the application, the application execution scalability information being specific to an execution mode for the first portion of the application; and to collect performance target information including an indication of one or more performance targets for the execution of the application;

perform a selection of a configuration from among the configurations detailed in the available resource information which, based on the application execution scalability information will come closest out of the configurations to meeting the one or more performance targets;

instruct the computing environment to execute the first portion of the application using the selected configuration; wherein for a change in an execution mode during the execution of the application caused by progressing from the first portion of the application to a forthcoming second portion:

the processor is configured to collect an updated version of the application execution scalability information, specific to the changed execution mode for the forthcoming second portion of the execution of the application, and to use the updated version to update a currently held version of the application execution scalability information; and using the updated version of the application execution scalability information, the processor is configured to perform an updated selection of configuration from among the configurations detailed in the available resource information which, based on the updated application execution scalability information will come closest out of the configurations to meeting the one or more performance targets specified in the performance target information; wherein the application execution scalability information is provided as a scalability matrix, the scalability matrix including an entry for each pair of factors from among factors comprising each category from among the plurality of computing resource categories and execution rate, the entry representing an effect of a proportional change along a linear scale representing usage of respective different amounts and types of a first factor from a pair of factors on the respective amount and type required of a second factor from the pair of factors, in terms of a proportional change along a linear scale representing the respective different amounts and types of the second factor, and the processor is configured to instruct the computing environment to perform the execution of the forthcoming second portion of the application using the updated selection of configuration.

10. A computing environment according to claim 9, further comprising a task scheduler, configured to allocate application executions to computers in accordance with instructions received from the application execution controller, wherein tasks include an execution of the application;

wherein the task scheduler is configured to obtain the application execution scalability information relating to the execution of the application, and, if the obtained application execution scalability information indicates a correlation of any of the categories with execution rate that exceeds a predetermined threshold correlation, to avoid allocating the execution of the application to computers already performing an execution of another application which also exceeds the predetermined threshold correlation in a same category.

11. An application execution control method for instructing an execution of an application in a computing environment having available to allocate to executing applications one or both of different amounts of computing resources in a plurality of computing resource categories and different types of computing resources in said plurality of computing resource categories; the method comprising;

collecting available resource information detailing configurations of computing resources available to execute the application, wherein the configurations each include an indication of respective amount and type of computing resource available in each category among the plurality of computing resource categories;

collecting application execution scalability information including, in respect of computing resources in at least one of the categories among the plurality of computing resource categories, an indication of how the respective different amounts and types of computing resources in the respective computing resource category correlate with execution rate of a first portion of the application, the application execution scalability information being specific to an execution mode for the first portion of the application; and collecting performance target information including an indication of one or more performance targets for the execution of the application; the method further comprising: performing a selection of a configuration from among the configurations detailed in the available resource information which, based on the application execution scalability information will come closest out of the configurations to meeting, the one or more performance targets; and instructing the computing environment to execute the first portion of the application using the-a selected configuration, the method further comprising, for a change in an execution mode during the execution of the application caused by progressing from the first portion of the application to a forthcoming second portions:

collecting an updated version of the application execution scalability information, specific to the changed execution mode for the forthcoming second portion of the execution of the application, and to use the updated version to update a currently held version of the application execution scalability information;

using the updated version of the application execution scalability information, performing an updated selection of configuration from among the configurations detailed in the available resource information which, based on the updated application execution scalability information will come closest out of the configurations to meeting the one or more performance targets specified in the performance target information; wherein the application execution scalability information is provided as a scalability matrix, the scalability matrix including an entry for each pair of factors from among factors comprising each category from among the plurality of computing resource categories and execution rate, the entry representing an effect of a proportional change along a linear scale representing usage of respective different amounts and types of a first factor from a pair of factors on the respective amount and type required of a second factor from the pair of factors, in terms of a proportional change along a linear scale representing the respective different amounts and types of the second factor, and instructing the computing environment to perform the execution of the forthcoming second portion of the application using the updated selection of configuration.

12. A non-transitory storage medium storing a computer program, which, when executed by a computing device, causes the computing device to perform an application execution control method for instructing an execution of an application in a computing environment having available to allocate to executing applications one or both of different amounts of computing resources in a plurality of computing resource categories and different types of computing resources in said plurality of computing resource categories; the method comprising:

collecting available resource information detailing configurations of computing resources available to execute the application, wherein the configurations each include an indication of respective amount and type of computing resource available in each category among the plurality of computing resource categories;

collecting application execution scalability information including, in respect of computing resources in at least one of the categories among the plurality of computing resource categories, an indication of how the respective different amounts and types of computing resources in the respective computing resource category correlate with execution rate of a first portion of the application, the application execution scalability information being specific to an execution mode for the first portion of the application; and collecting performance target information including an indication of one or more performance targets for the execution of the application; the method further comprising:

performing a selection of a configuration from among the configurations detailed in the available resource information which, based on the application execution scalability information will come closest out of the of configurations to meeting, the one or more performance targets; and instructing the computing environment to execute the first portion of the application using a selected configuration;

the method further comprising, for a change in an execution mode during the execution of the application caused by progressing from the first portion of the application to a forthcoming second portion:

collecting an updated version of the application execution scalability information, specific to the changed execution mode for the forthcoming second portion of the execution of the application, and to use the updated version to update a currently held version of the application execution scalability information;

using the updated version of the application execution scalability information, performing an updated selection of configuration from among the configurations detailed in the available resource information which, based on the updated application execution scalability information will come closest out of the configurations to meeting the one or more performance targets specified in the performance target information; wherein the application execution scalability information is provided as a scalability matrix, the scalability matrix including an entry for each pair of factors from among factors comprising each category from among the plurality of computing resource categories and execution rate, the entry representing an effect of a proportional change along a linear scale representing usage of respective different amounts and types of a first factor from a pair of factors on the respective amount and type required of a second factor from the pair of factors, in terms of a proportional change along a linear scale representing the respective different amounts and types of the second factor, and instructing the computing environment to perform the execution of the forthcoming second portion of the application using the updated selection of configuration.

* * * * *